US006507986B1

(12) United States Patent
Tomiser, Jr. et al.

(10) Patent No.: US 6,507,986 B1
(45) Date of Patent: Jan. 21, 2003

(54) BLADE TOOL FOR CUTTER HEAD OF THICKNESS PLANERS

(75) Inventors: Frank J. Tomiser, Jr., St. Louis, MO (US); Randall E. Campbell, Hazelwood, MO (US); Paul J. Eckhoff, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/478,712

(22) Filed: Jan. 6, 2000

(51) Int. Cl.[7] .................................................. B23P 19/04
(52) U.S. Cl. .......................................................... 29/267
(58) Field of Search .......................... 29/267, 270, 278; 81/485; 254/131, 25, 28

(56) References Cited

U.S. PATENT DOCUMENTS

| | | | | | |
|---|---|---|---|---|---|
| 2,577,975 | A | | 12/1951 | Moore | 144/117 |
| 2,624,382 | A | | 1/1953 | Moore | 144/116 |
| 3,075,284 | A | * | 1/1963 | Salazer | 29/267 |
| 3,718,168 | A | | 2/1973 | Berends | 144/117 R |
| 3,913,642 | A | | 10/1975 | Porter | 144/114 R |
| 4,067,370 | A | | 1/1978 | Chang | 144/117 R |
| 4,436,126 | A | | 3/1984 | Lawson | 144/117 R |
| 4,485,859 | A | | 12/1984 | Krogstad et al. | 144/252 R |
| 4,553,737 | A | * | 11/1985 | Yi | 254/28 |
| 4,991,636 | A | | 2/1991 | Robson | 144/116 |
| 5,174,348 | A | | 12/1992 | Miyamoto et al. | 144/117 R |
| 5,284,192 | A | | 2/1994 | Sato et al. | 144/117 R |
| 5,771,949 | A | | 6/1998 | Welsh et al. | 144/130 |
| 5,794,675 | A | | 8/1998 | Garcia | 144/117.1 |
| 5,927,357 | A | | 7/1999 | Welsh et al. | 144/130 |
| 6,038,754 | A | * | 3/2000 | Stafford | 254/25 |
| 6,052,881 | A | * | 4/2000 | Vuorinen et al. | 29/267 |
| 6,105,936 | A | * | 8/2000 | Malek | 254/28 |

OTHER PUBLICATIONS

Owner's Manual for a 12 1/2' Portable Planer by Delta; 1996.

* cited by examiner

*Primary Examiner*—Robert C. Watson
(74) *Attorney, Agent, or Firm*—Howrey Simon Arnold & White, LLP

(57) ABSTRACT

A blade tool that is useful for removing and installing blades into and out of a cutter head which is rotatably mounted in a thickness planer. The blade tool consists of a handle and a hook portion. This hook portion is designed to pull or pry blades away from the cutter head when removing the blades from the cutter head. The handle of the blade tool defines a curved portion that is designed to press against the edge of the blade when installing the blade into the cutter head. The blade tool may further comprise a magnet coupled inside a cavity at the end of the handle. The magnet is designed to extract the blade away from the cutter head once it has been loosened by the hook portion. In one embodiment, the magnet is a rare earth magnet.

22 Claims, 8 Drawing Sheets

BLADE TOOL FOR CUTTER HEAD OF THICKNESS PLANERS

BACKGROUND OF THE INVENTION

1. Field of the Invention

The present invention relates generally to thickness planers, and more specifically, to an apparatus and method for changing blades into and out of thickness planers.

2. Description of Related Art

Generally, a thickness planer is used to finish a piece of lumber, i.e., to uniformly reduce the thickness of the lumber while achieving a smooth, flat surface. The basic components of a typical thickness planer are a table, a cutter head, infeed and outfeed rollers, and a motor. The table levels and supports the workpiece as the workpiece is fed into the planer and is passed under the rapidly rotating cutter head. The cutter head includes two or more blades mounted within its cylindrical head which cut away thin slivers of wood as the workpiece is passed beneath it.

The powered infeed and outfeed rollers grip and support the workpiece as they advance and pull the workpiece through the cutter head. These rollers are typically spring mounted so that the pressure exerted by the rollers on the workpiece can be adjusted to ensure the rollers properly engage and guide the workpiece through the planer. The motor drives the cutter head and the powered rollers.

Typical thickness planers have only one cutter head located above the planer table. Thus, both sides of the board must be passed through the planer to attain the desired finished surface. Additionally, several passes through the planer may be required to remove the desired amount of wood from the workpiece. The depth of cut adjustments is made by lowering the cutter head towards the workpiece.

The blades that are used for thickness planers can be single-sided, but are quite often double-sided and sharp on both edges. Thus, installing or removing these blades into or out of the cutter head can be difficult and frustrating to the operator whose fingers and hands can easily be harmed, especially in light of the tight workspace available for changing the blades.

Currently, standard hand tools, e.g., screwdrivers or long-nosed pliers, are being used to pry blades loose or to remove the blades from the cutter head. However, since these tools are not specifically designed to remove these types of blades, the use of such tools could be clumsy and awkward. Similarly, other standard tools, such as hammers and handles of screwdrivers, are being used to press the edges of the blades while seating them into the cutter blade. As a result of such treatment, the blades would become dull, nicked, or damaged.

Previous attempts have been made with other removal tool design to provide a blade removal tool that consists of a flat strip composite magnet. However, the composite magnet that has been used has insufficient strength to hold the blade during insertion. Moreover, this tool is ineffective in removing a blade when the blade is imbedded in sawdust and sap resulting from planing the wood.

The present invention addresses the shortcomings associated with the prior art.

SUMMARY OF THE INVENTION

In an aspect of the invention, an apparatus and method are provided for a blade tool that is useful for removing and installing blades into and out of a cutter head which is rotatably mounted in a thickness planer. The blade tool consists of a handle and a hook portion. This hook portion is designed to pull or pry blades away from the cutter head when removing the blades from the cutter head.

In another aspect of the invention, the hook portion defines a notch, which has a width sufficient to hold a portion of the blade when prying the blade away from the cutter head. The notch may be rectangularly shaped.

In a further aspect of the invention, the hook portion defines an angularly-shaped hook which works in conjunction with the notches on the end of the blade.

In a still further aspect of the invention, the handle of the blade tool has a thickness that is wider than the thickness of the hook portion.

In another aspect of the invention, the handle of the blade tool defines a curved portion that is designed to press against the edge of the blade to fully seat it in the proper location when installing the blade into the cutter head.

Yet, in another aspect of the invention, the blade tool further comprises a magnet coupled inside a cavity at the end of the handle. The magnet is designed to extract the blade away from the cutter head once it has been loosened by the hook portion.

The blade tool in accordance with the present invention has many advantages. he blade tool in accordance with the present invention gives a thickness planer operator the ability to install and remove blades into and out of the cutter head without having to use his or her hand and fingers, which significantly reduces the possibility of injury to the hands and fingers.

Another advantage of the blade tool is its multi-purposed concept in which the blade tool enables the operator to use the same tool for seating the blade during installation or loosening and extracting the blade during removal. In this manner, he would only have to keep one tool for blade changes.

Also, various features of the blade tool provide the operator more control over the blade when removing or installing the blade into or out of the cutter head.

BRIEF DESCRIPTION OF THE DRAWINGS

The features and advantages of the present invention will be best appreciated upon reference to the following detailed description and the accompanying drawings, in which.

Figure 1:
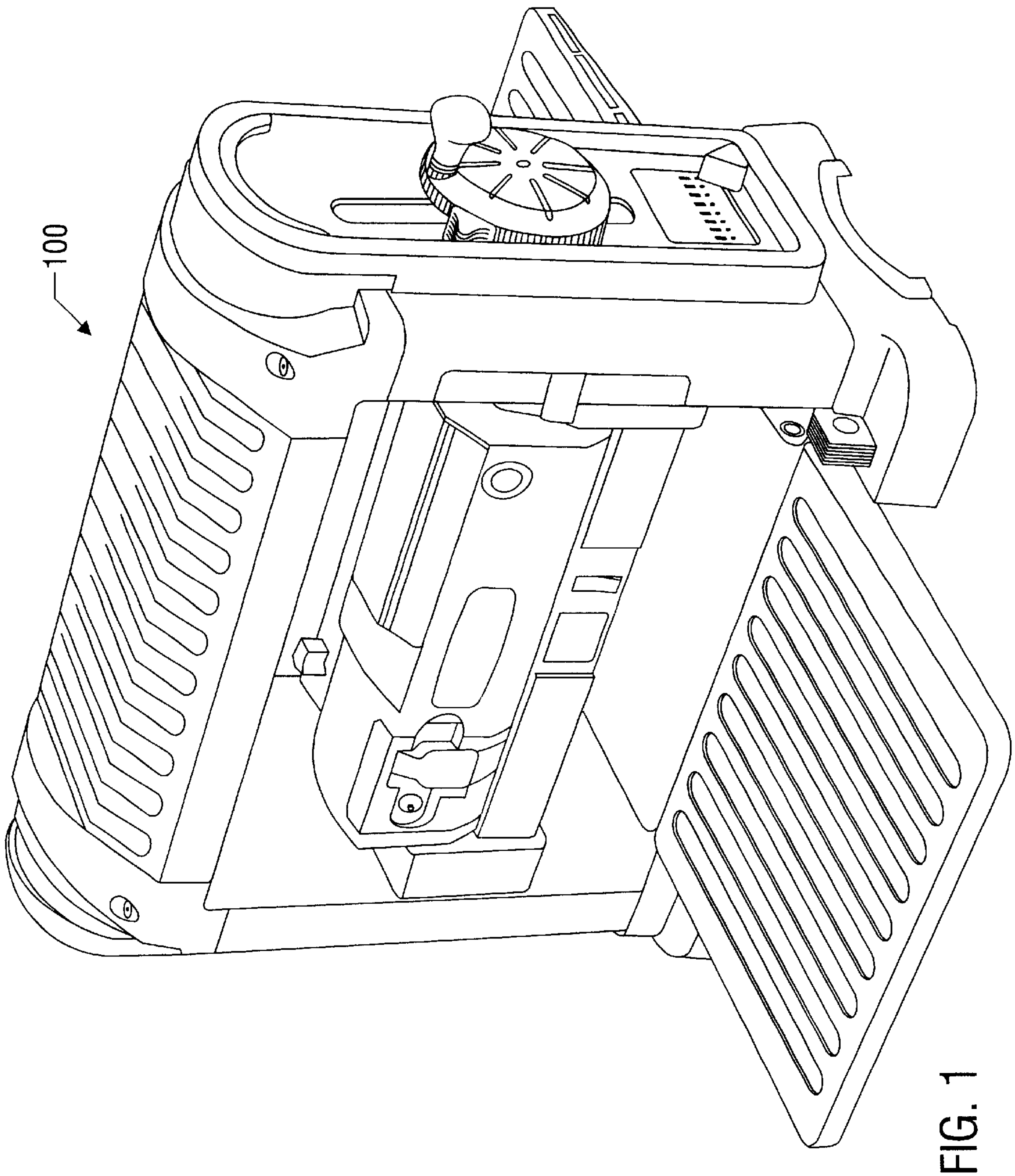
FIG. 1 is a perspective view of a thickness planer employing a set of blades removable by the blade tool in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
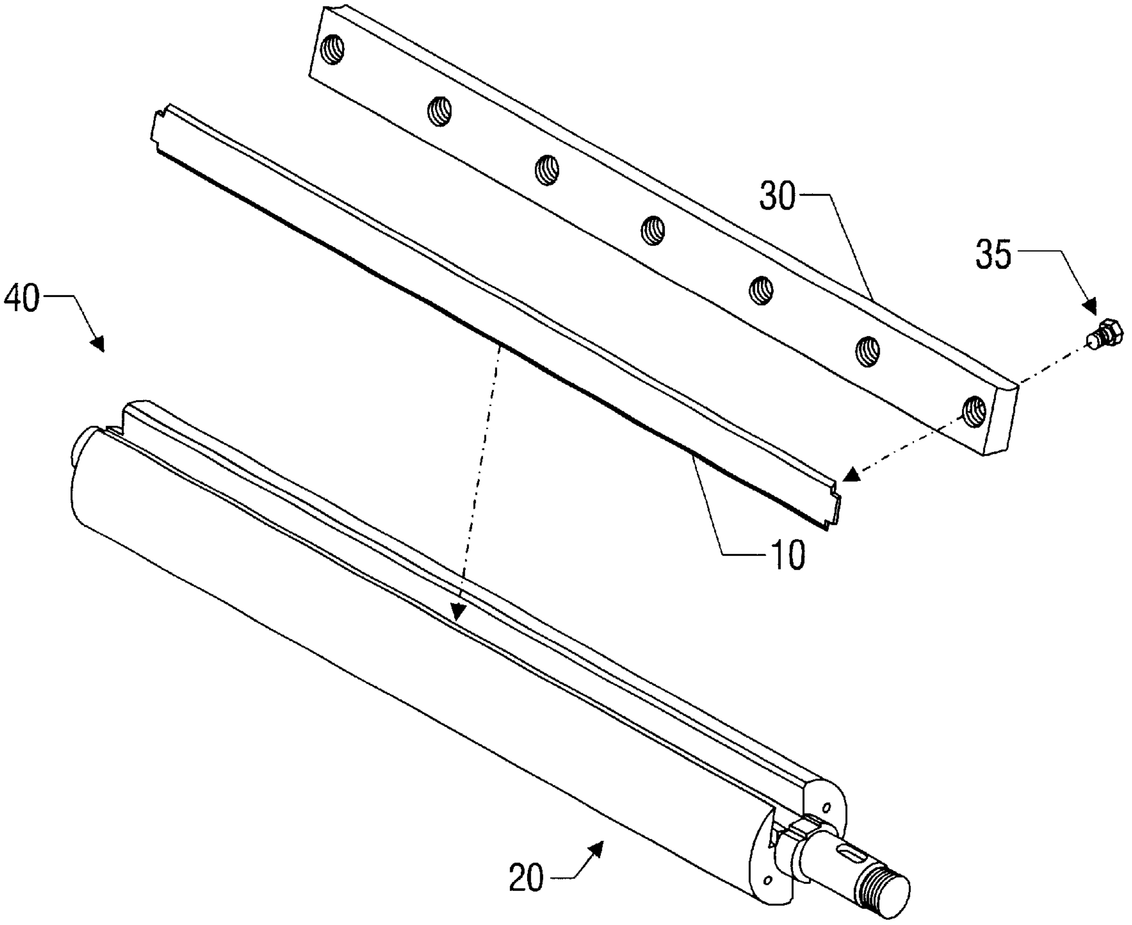
FIG. 2 illustrates an exploded view of a cutter head inside the thickness planer illustrated in FIG. 1.
Figure 4:
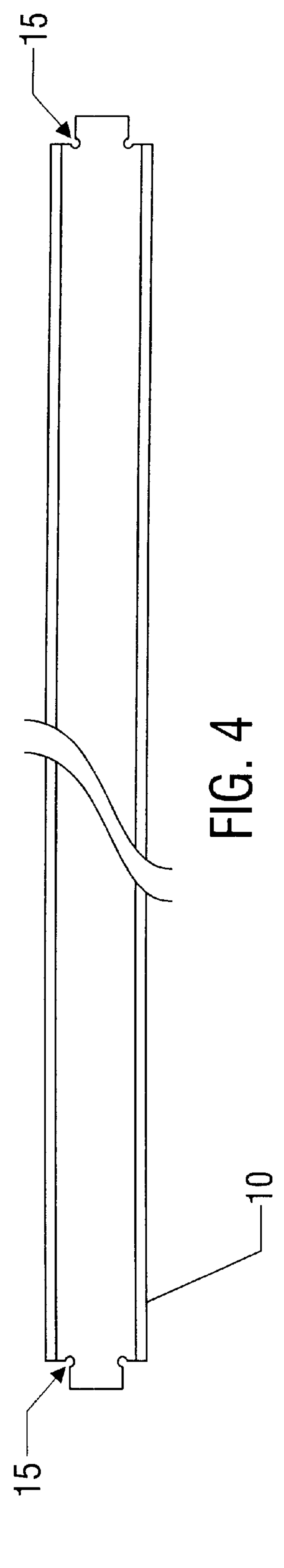
FIG. 4 illustrates a close up view of the blade that is adaptable to be removed by the blade tool.

Turning to the figures, FIG. 1 illustrates a perspective view of a thickness planer 100 employing a cutter head rotatably mounted therein and a set of blades mounted within the cutter head. Two or more blades may be mounted on the cutter head. They may also be 180 degrees apart from each other. When the cutter head is rotated, the blades remove small amounts of wood from the workpiece to plane the workpiece to a desired smooth thickness. FIG. 2 illustrates an exploded view of a blade 10 that is adapted to be mounted to a cutter head 20. In one embodiment, the blade 10 is wedged between a bar knife lock 30 and the inside wall of a knife slot 40 on the cutter head 20. In this manner, the blade 10 is held inside the cutter head by a set of fasteners, e.g., screws. In one embodiment, seven bolts/jack screws are used to secure the blade 10 to the cutter head 20. An embodiment of the blade 10 is shown in FIG. 4 as having a notch 15 at both ends of the blade 10. Such a notch is not required, but can be at both ends and on top and bottom for a double-edged blade.

FIG. 3 illustrates various views of a blade tool 50 in accordance with an embodiment of the present invention. The blade tool 50 includes a handle 60 and a hook portion 70. In one embodiment, the handle 60 and the hook portion 70 is linear in shape. However, the handle 60 may be formed in a curved fashion as shown in FIG. 3A. The blade tool 50 is not limited by a particular shape. It could be shaped in any suitable form.

Figure 3A:
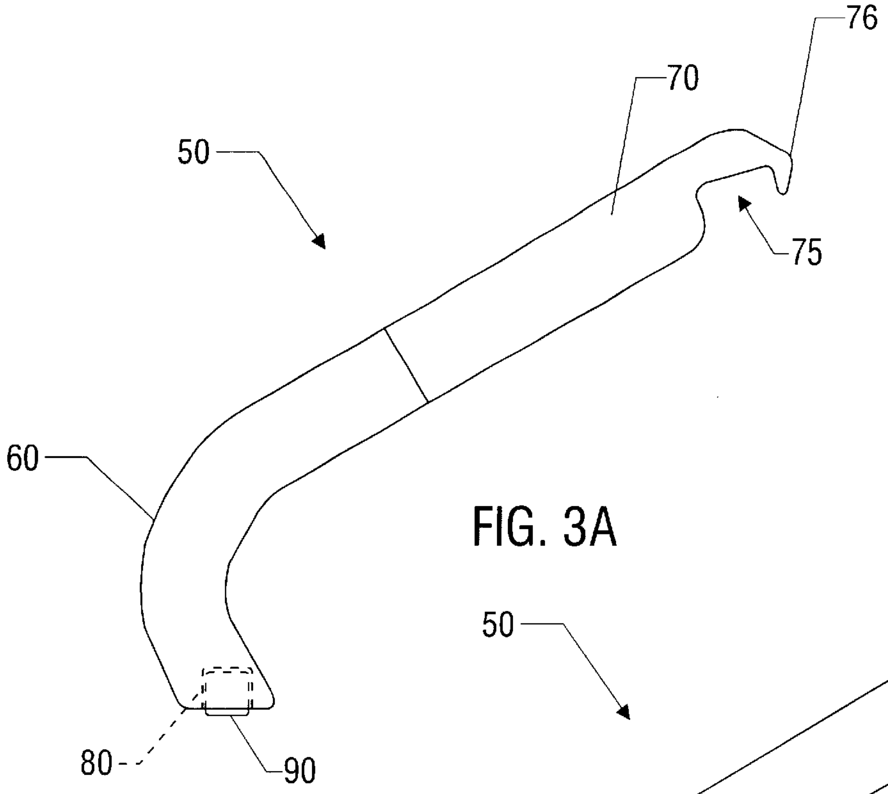
FIG. 3 illustrates various views of a blade tool in accordance with the present invention.
Figure 3D:
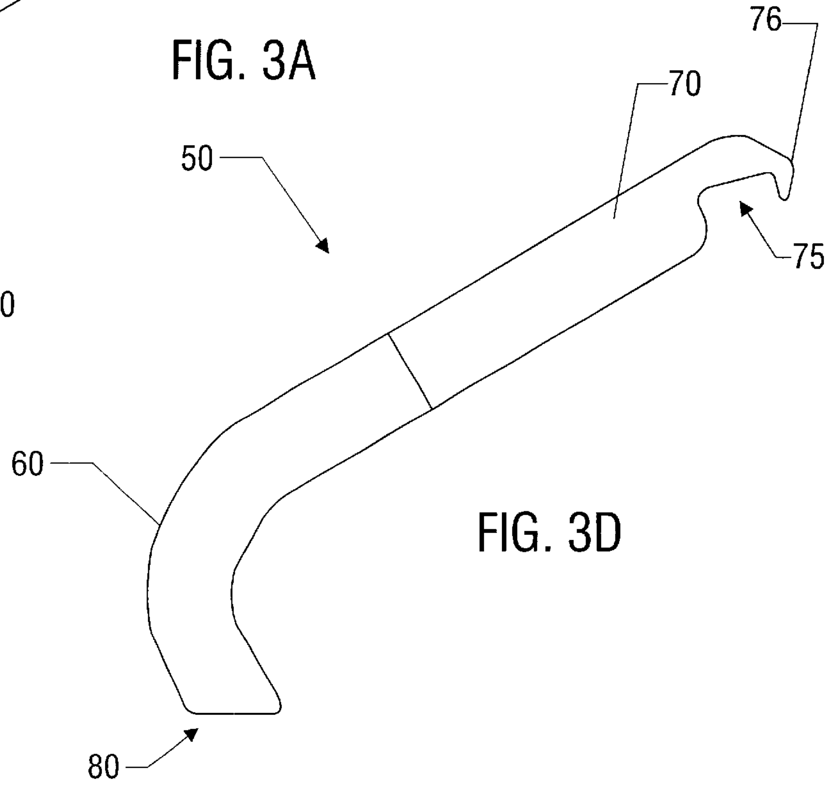
Figure 3B:
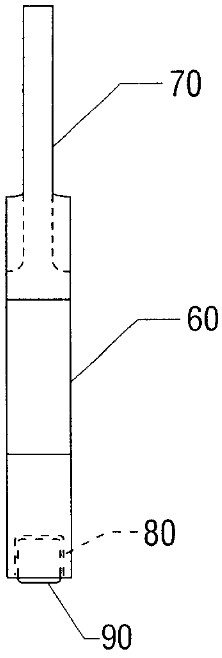
Figure 3C:
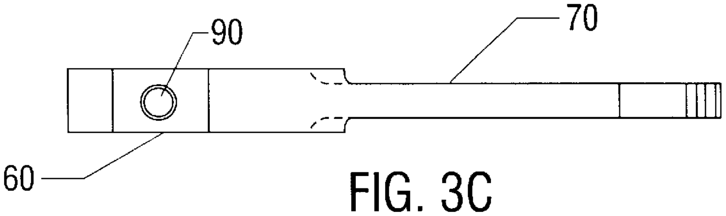

In another embodiment, the blade tool 50 further includes a magnet 90 for retrieving the blade 10 from the cutter head 20. For example, the magnet 90 may be coupled at the end of the handle 60. FIGS. 3A–3C illustrate a blade tool 50 with a magnet 90 whereas FIG. 3D illustrates a blade tool 50 without a magnet. In one specific embodiment, the end of the handle 60 contains a cavity 80 with a magnet 90 imbedded therein. The magnet 90 may be press fitted into the cavity 80 or attached by other means available in the art. The magnet 90 may be fitted within the cavity such that a portion of is the magnet 90 slightly protrudes out of the cavity 80. In one embodiment, the magnet 90 may also be a rare earth magnet. Accordingly, the magnet 90 has the capability of picking up at least a pound of metal. Thus, conceivably it would be strong enough to remove the blade 10 without prior loosening by the blade tool 50. However, any type of magnet may be used with this embodiment. Further, the magnet 90 may be of any shape, although the cylindrically shaped magnet 90 is sown in the figures, provided cavity 80 in handle 60 can accommodate the shape of magnet 90.

At the opposite end of the magnet 90 is the hook portion 70, which includes a notch 75 that may have sufficient width to hold the notched end 15 of the blade 10. In one embodiment, the notch 75 is rectangularly shaped. However, the notch 75 may be shaped in any manner so long as it is capable of hooking the blade 10. The hook portion 70 may further include an angularly shaped hook 76 so that it may easily reach in between the tight crevices of the cutter head 20. As shown in FIGS. 3B and 3C, the handle 60 may be thicker than the hook 70.

Figure 5:
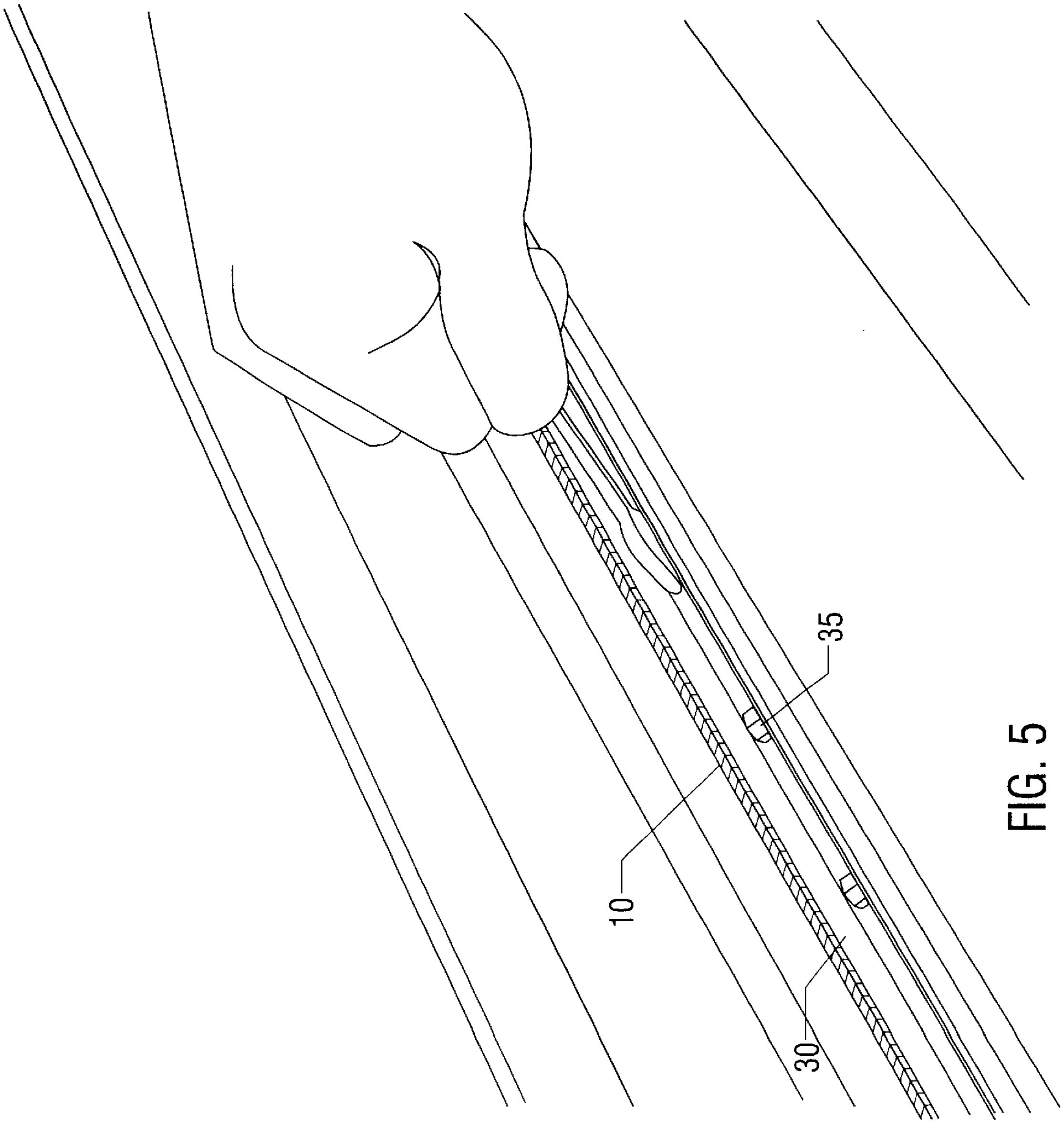
FIG. 5 illustrates a perspective view of a standard tool being used to loosen the knife lock screws that are holding the blade against the cutter head.
Figure 6:
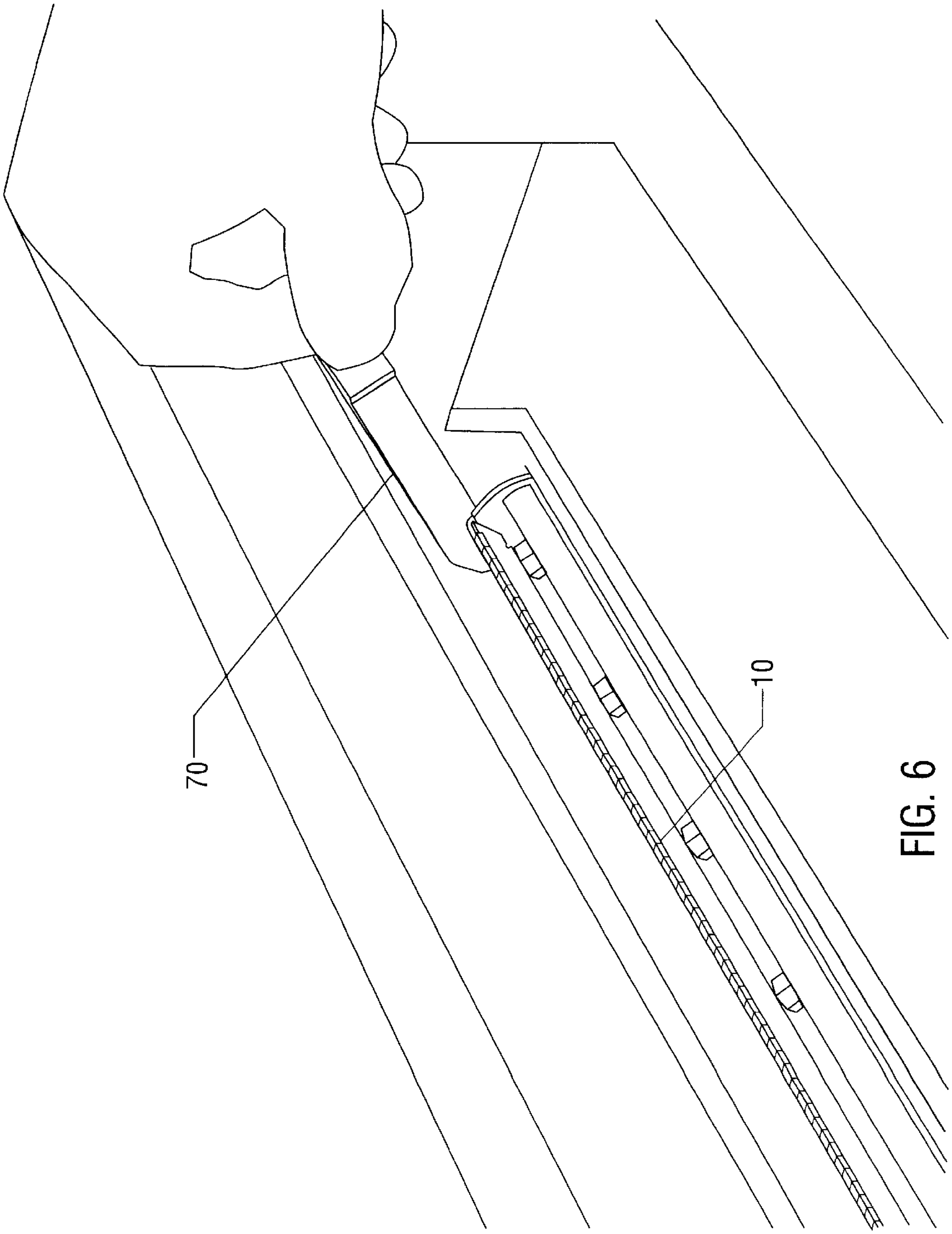
FIG. 6 illustrates a perspective view of the hook portion of the blade tool being used to pry a blade from a cutter head inside the thickness planer illustrated in FIG. 1.

The blade tool 50 in accordance with the present invention has many functions. For example, the hook portion 70 of the blade tool 10 may be used for pullinmg or prying the blade 10 away from the knife slot 40 in the cutter head 20 (see FIG. 6) once the screws 35 on the bar knife lock 30 have been released with a standard tool, such as a wrench, as shown in FIG. 5. More specifically, the hook portion 70 of the blade tool 50 may be used to latch the notched end 15 of the blade 10 and loosen the blade 10 from the cutter head 20.

In one embodiment, the notch 75 at the end of the hook portion 70 has a width that is slightly larger than the notched end 15 of the blade 10 and thus, the hook portion 70 may easily pry the blade 1O from the cutter head 20. The hook portion 70 becomes even more useful for removing the blade 10 when the blade 10 is imbedded in the knife slot 40 with wood chips, sawdust or sap from planing the wood. With the use of the hook 76, the operator can easily tug at the blade 10 and loosen the blade 10 ready for extraction. Although the hook portion 70 has been described in the context of removing a blade from a cutter head of a thickness planer, the hook portion 70 of the present invention may be equally advantageously practiced for other functions.

Figure 7:
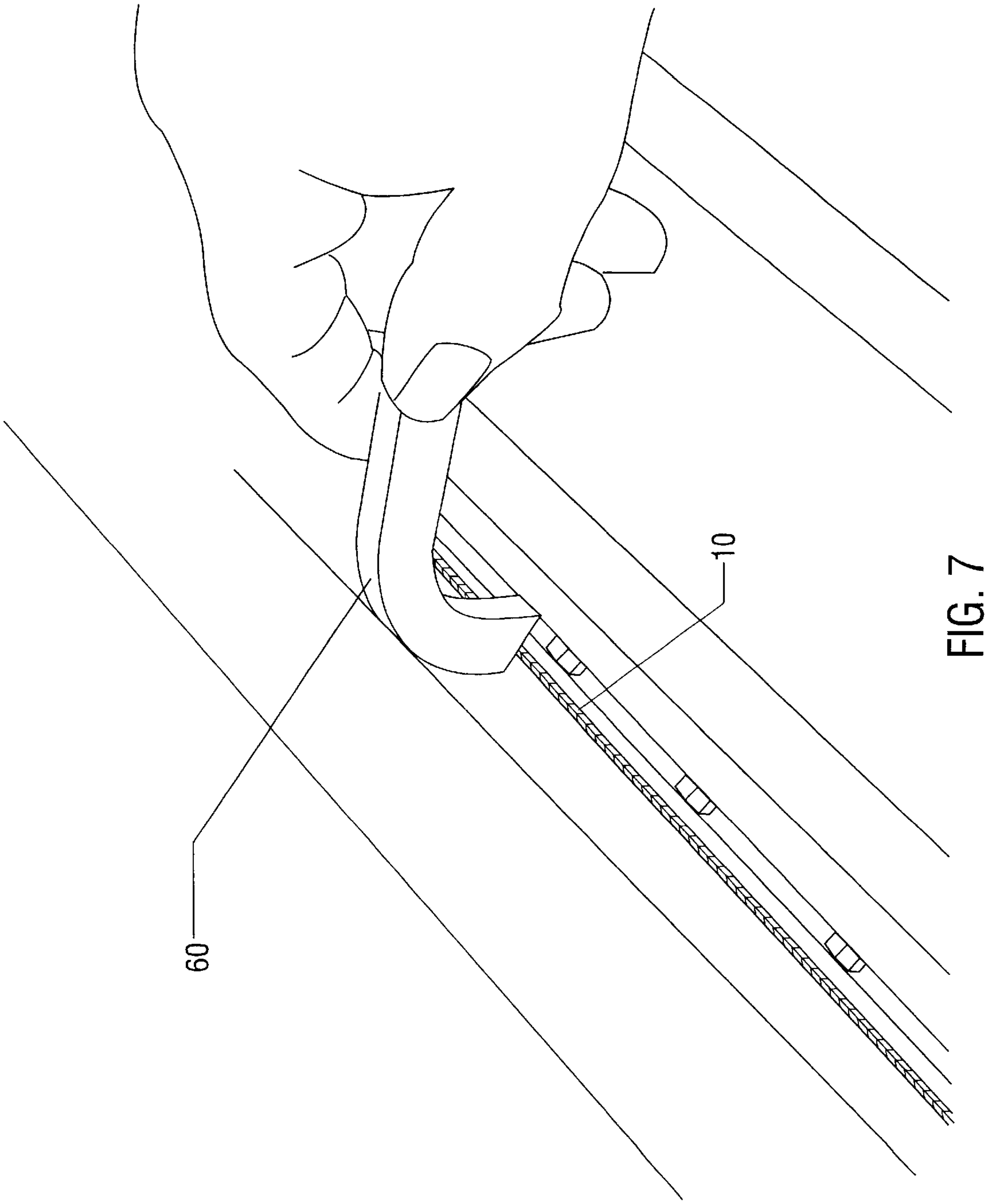
FIG. 7 illustrates a perspective view of the magnet of the blade tool being used to extract the blade from a cutter head.

After the hook portion 70 loosened the blade 10 from the bar knife lock 30, the magnet 90 feature at the end of the handle 60 may be used with a rag to extract the blade 10 away from the cutter head 20, as shown in FIG. 7. In this manner, the magnet 90 helps the operator to extract the blade 10 and reduces his risk of getting cut by the sharp edges of blade 10. Consequently, this feature of the blade tool 50 also proves to be very helpful, especially in light of how sharp the edge of the blade 10 can be. Moreover, the magnet 90 of the present invention may be equally advantageously practiced for extracting other objects.

Figure 8:
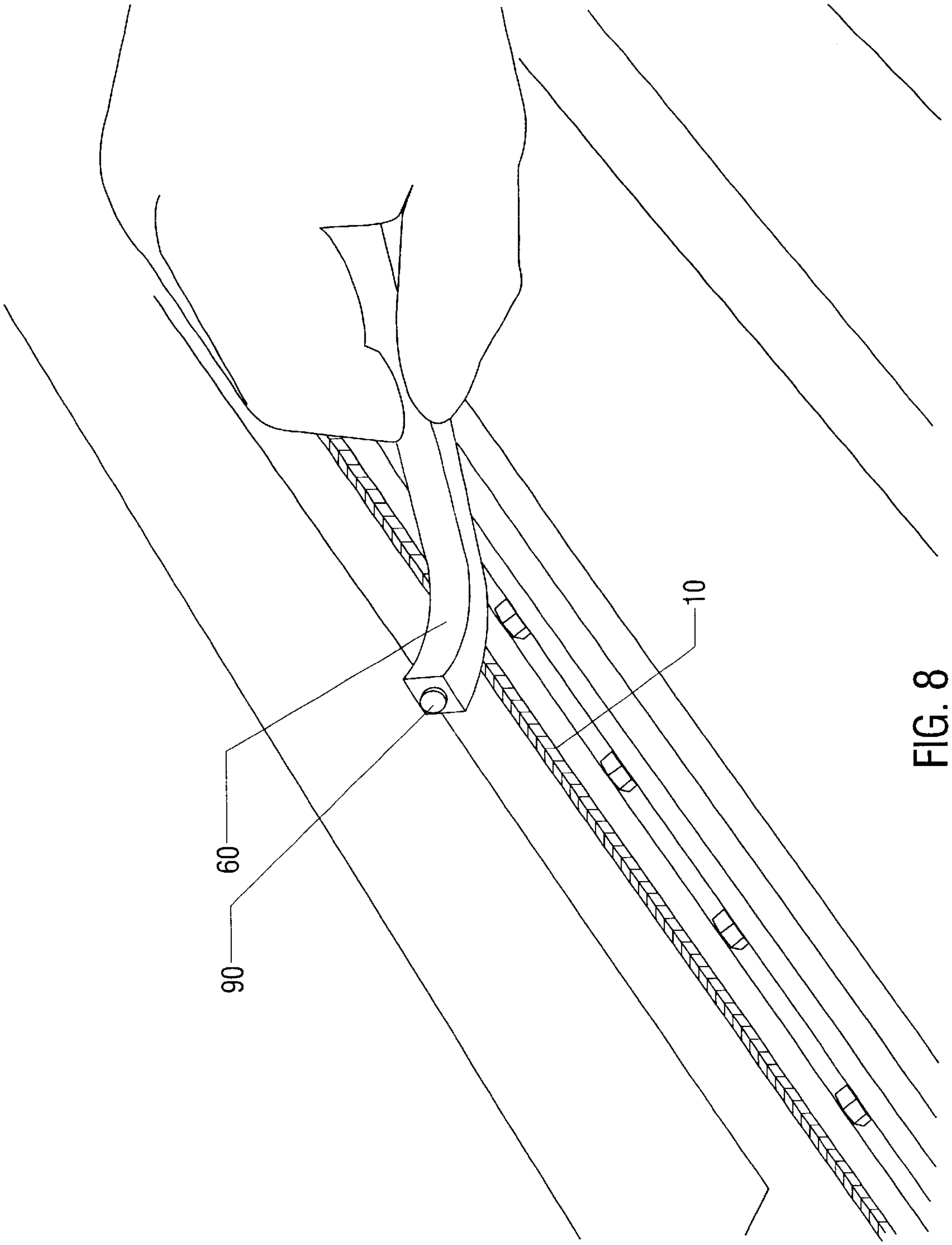
FIG. 8 illustrates a perspective view of the curved end of the handle of the blade tool being used to seat the blade into the cutter head.

Another feature of the blade tool 50 is illustrated in FIG. 8, in which the curved portion of the handle 60 is being used to apply pressure to the sharp edge of the blade 10 when seating the blade 10 into the knife slot 40 during blade installation. Pressure is applied to the edge of the blade 10 as the curved portion of the handle 60 makes a line contact with the edge. This curved portion of the handle 60 provides an alternative mechanism to using hands or standard tools for seating the blade 10 into the knife slot 40. By using the handle 60 of the blade tool 50, the operator of the thickness planer may easily avoid the sharp edges of the blade 10 when seating the blade 10. Although the curved portion of the handle 60 has been described in the context of installing a blade into the cutter head of the thickness planer, the curved portion of the handle 60 may be equally advantageously practiced for other purposes.

The handle 60 of the blade tool 50 may be made from any material that is durable and has good traction for gripping, such as polymer, polycarbonate, ABS, or nylon. The hook portion 70, on the other hand, may be made from any type of material that has sufficient strength to pull a sharp blade. The handle and the hook portion may be an integral or separable unit. The magnet 90 portion of the blade tool 50 of the present invention can be used for any thickness planer, including the 13" thickness planers. Although the blade tool 50 has been described in the context of changing the blade of the cutter head of a thickness planer, the blade tool 50 of the present invention may be equally advantageously practiced for other machines or functions.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown. It is therefore evident that the particular embodiments disclosed above might be altered or modified and all such variations are considered within the scope and spirit of the invention.

What is claimed is:

1. A blade tool for changing a blade out of a cutter head in a thickness planer, wherein the blade is mounted on the cutter head and the cutter head is rotatably mounted inside the thickness planer, the blade tool comprising:

a handle; and a hook portion coupled to the handle, wherein the hook portion is adaptable to pry the blade away from the cutter head when removing the blade from the cutter head, the hook portion defining a rectangularly shaped notch having a width sufficient to hold a portion of the blade when prying the blade away from the cutter head.

2. The blade tool of claim 1, wherein the hook portion defines an angularly shaped hook.

3. The blade tool of claim 1, wherein the thickness of the hook portion is narrower than the thickness of the handle.

4. The blade tool of claim 1, wherein the handle defines a curved portion adaptable to press against the edge of the blade for installing the blade into the cutter head of the thickness planer.

5. A blade tool for changing a blade out of a cutter head in a thickness planer, wherein the blade is mounted on the cutter head and the cutter head is rotatably mounted inside the thickness planer, the blade tool comprising:

a handle;

a magnet coupled to the end of the handle; and a hook portion coupled to the handle, wherein the hook portion is adaptable to pry the blade away from the cutter head when removing the blade from the cutter head.

6. The blade tool of claim 5, wherein the handle defines a cavity at the end of the handle adaptable for coupling the magnet therein.

7. The blade tool of claim 6, wherein the magnet protrudes outside the cavity when coupled inside the cavity at the end of the handle.

8. The blade tool of claim 5, wherein the magnet is a rare earth magnet.

9. The blade tool of claim 5, wherein the magnet is adaptable to extract the blade from the cutter head.

10. A blade tool for changing a blade out of a cutter head in a thickness planer, wherein the blade is mounted on the cutter head and the cutter head is rotatably mounted inside the thickness planer, the blade tool comprising:

a handle; and means, coupled to the handle, for prying the blade away from the cutter head when removing the blade from the cutter head, wherein the means for prying includes a rectangularly shaped notch.

11. The blade tool of claim 10, further comprising means for pressing against the edge of the blade for installing the blade into the cutter head.

12. The blade tool of claim 11, wherein the handle defines a curved portion, the curved portion defining the pressing means.

13. A blade tool for changing a blade out of a cutter head in a thickness planer, wherein the blade is mounted on the cutter head and the cutter head is rotatably mounted inside the thickness planer, the blade tool comprising:

a handle;

a magnet coupled to the end of the handle; and means, coupled to the handle, for prying the blade away from the cutter head when removing the blade from the cutter head, wherein the means for prying includes a rectangularly shaped notch.

14. The blade tool of claim 13, further comprising means for pressing against the edge of the blade for installing the blade into the cutter head.

15. The blade tool of claim 14, wherein the handle defines a curved portion, the curved portion defining the pressing means.

16. A blade tool for changing a blade out of a cutter head in a thickness planer, wherein the blade is mounted on the cutter head and the cutter head is rotatably mounted inside the thickness planer, the blade tool comprising:

a handle; and a hook portion coupled to the handle, the thickness of the hook portion being narrower than the thickness of the handle, wherein the hook portion is adaptable to pry the blade away from the cutter head when removing the blade from the cutter head.

17. The blade tool of claim 16, wherein the hook portion defines an angularly shaped hook.

18. A blade tool for changing a blade out of a cutter head in a thickness planer, wherein the blade is mounted on the cutter head and the cutter head is rotatably mounted inside the thickness planer, the blade tool comprising:

a handle defining a curved portion adaptable to press against the edge of the blade for installing the blade into the cutter head of the thickness planer; and a hook portion coupled to the handle, wherein the hook portion is adaptable to pry the blade away from the cutter head when removing the blade from the cutter head.

19. The blade tool of claim 18, wherein the hook portion defines an angularly shaped hook.

20. A blade tool for changing a blade out of a cutter head in a thickness planer, wherein the blade is mounted on the cutter head and the cutter head is rotatably mounted inside the thickness planer, the blade tool comprising:

a handle defining a curved portion, the curved portion defining a means for pressing against the edge of the blade for installing the blade into the cutter head; and means, coupled to the handle, for prying the blade away from the cutter head when removing the blade from the cutter head.

21. The blade tool of claim 20, further comprising means for extracting the blade from the cutter head.

22. The blade tool of claim 21, wherein the extracting means is coupled to the end of the handle.

* * * * *